US012382558B2

(12) United States Patent
Chen et al.

(10) Patent No.: US 12,382,558 B2
(45) Date of Patent: Aug. 5, 2025

(54) LAMP COLOR CORRECTION METHOD AND SYSTEM, AND STORAGE MEDIUM

(71) Applicant: GUANGZHOU YAJIANG PHOTOELECTRIC EQUIPMENT CO., LTD., Guangdong (CN)

(72) Inventors: Zhiman Chen, Guangdong (CN); Rongfeng Huang, Guangdong (CN); Guohai Wang, Guangdong (CN)

(73) Assignee: GUANGZHOU YAJIANG PHOTOELECTRIC EQUIPMENT CO., LTD., Guangzhou (CN)

( * ) Notice: Subject to any disclaimer, the term of this patent is extended or adjusted under 35 U.S.C. 154(b) by 0 days.

(21) Appl. No.: 18/036,402

(22) PCT Filed: Oct. 19, 2022

(86) PCT No.: PCT/CN2022/126092
§ 371 (c)(1),
(2) Date: May 11, 2023

(87) PCT Pub. No.: WO2023/124429
PCT Pub. Date: Jul. 6, 2023

(65) Prior Publication Data

US 2024/0341018 A1 Oct. 10, 2024

(30) Foreign Application Priority Data

Dec. 30, 2021 (CN) ........................ 202111680140.4

(51) Int. Cl.
*H05B 45/20* (2020.01)
*H05B 45/22* (2020.01)

(52) U.S. Cl.
CPC .................................... *H05B 45/22* (2020.01)

(58) Field of Classification Search
CPC ........ H05B 45/20; H05B 45/22; H05B 45/30; H05B 45/42; H05B 45/44; H05B 45/52;
(Continued)

(56) References Cited

U.S. PATENT DOCUMENTS 9,433,066 B2 * 8/2016 Burkhart ................ H05B 45/10
10,754,171 B2 * 8/2020 Bae ........................ G09G 3/003
(Continued)

*Primary Examiner* — Tung X Le

(57) ABSTRACT

Disclosed are a lamp color correction method and system, and a storage medium. The lamp color correction method includes: acquiring each monochromatic illuminance, each monochromatic chromaticity coordinate, a first panchromatic illuminance and first panchromatic chromaticity coordinates of a target lamp; acquiring a first parameter if the acquired monochromatic and panchromatic illuminances and chromaticity coordinates are acceptable; acquiring an output value of each monochromatic channel; acquiring a second panchromatic illuminance and second panchromatic chromaticity coordinates of the target lamp; and determining that the target lamp is acceptable and updating the output value of each monochromatic channel to the target lamp, if a ratio of the second panchromatic illuminance to the first panchromatic illuminance is greater than or equal to a preset first threshold and a difference between the second panchromatic chromaticity coordinate and a standard panchromatic chromaticity coordinate satisfies a preset third deviation range.

17 Claims, 2 Drawing Sheets

(58) Field of Classification Search
CPC ...... H05B 45/54; H05B 45/60; H05B 47/105; H05B 47/155; H05B 47/165
See application file for complete search history.

(56) References Cited

U.S. PATENT DOCUMENTS

| | | | | |
|---|---|---|---|---|
| 11,330,685 | B2 * | 5/2022 | Chen | H05B 45/30 |
| 2011/0175510 | A1 * | 7/2011 | Rains, Jr. | C09K 11/574<br>977/773 |
| 2018/0090076 | A1 * | 3/2018 | Zhang | G09G 3/342 |
| 2021/0307139 | A1 * | 9/2021 | Green | H05B 45/22 |

* cited by examiner

LAMP COLOR CORRECTION METHOD AND SYSTEM, AND STORAGE MEDIUM

TECHNICAL FIELD

The present disclosure relates to the technical field of multicolor light-emitting diode (LED) lamps, and in particular to a lamp color correction method and system, and a storage medium.

BACKGROUND

Due to the difference in brightness, the panchromatic colors of different batches or even the same batch of multicolor LED lamps are different, and the mixing effects of two or three colors thereof are also different. In order to improve the application effect of the multicolor LED lamps, usually, workers manually adjust the multicolor LED lamps before delivery, and determine whether the panchromatic colors of the lamps are basically the same by their naked eyes. The operation is time-consuming, labor-intensive, and puts high requirements on the worker. However, different workers may set different values, making it difficult to guarantee uniformity.

SUMMARY

An objective of the present disclosure is to improve lamp color correction efficiency and improve the color display effect of lamps by correction.

In order to achieve the above objective, the present disclosure provides a lamp color correction method, including:

- acquiring each monochromatic illuminance, each monochromatic chromaticity coordinate, a first panchromatic illuminance and first panchromatic chromaticity coordinates of a target lamp;
- determining whether a ratio of each monochromatic illuminance to each preset standard monochromatic illuminance satisfies a preset first deviation range; determining whether a difference between each monochromatic chromaticity coordinate and each preset standard monochromatic chromaticity coordinate satisfies a preset second deviation range;
- acquiring a minimum ratio of the monochromatic illuminance to the preset standard monochromatic illuminance as a first parameter, if the ratio of each monochromatic illuminance to each preset standard monochromatic illuminance satisfies the first deviation range and the difference between each monochromatic chromaticity coordinate and each preset standard monochromatic chromaticity coordinate satisfies the second deviation range;
- acquiring an output value of each monochromatic channel based on a product of the first parameter and each preset standard monochromatic illuminance, where there is at least an output value of the monochromatic channel that is 255; and
- acquiring a second panchromatic illuminance and second panchromatic chromaticity coordinates of the target lamp based on the acquired output value of each monochromatic channel; and determining that the target lamp is acceptable and updating the output value of each monochromatic channel to the target lamp, if a ratio of the second panchromatic illuminance to the first panchromatic illuminance is greater than or equal to a preset first threshold and a difference between the second panchromatic chromaticity coordinate and a standard panchromatic chromaticity coordinate satisfies a preset third deviation range.

Further, the lamp color correction method further includes: measuring each new monochromatic illuminance of the target lamp based on the output value of each monochromatic channel, if the ratio of the second panchromatic illuminance to the first panchromatic illuminance is less than the first threshold or the difference between the second panchromatic chromaticity coordinate and the standard panchromatic chromaticity coordinate does not satisfy the third deviation range; acquiring each monochromatic illuminance correction value based on each new monochromatic illuminance, each preset standard monochromatic illuminance, and the first parameter; acquiring a new output value of each monochromatic channel based on each new monochromatic illuminance and each monochromatic illuminance correction value; acquiring a third panchromatic illuminance and third panchromatic chromaticity coordinates of the target lamp based on the new output value of each monochromatic channel; verifying whether the third panchromatic illuminance and the third panchromatic chromaticity coordinates of the target lamp are acceptable; and updating the new output value of each monochromatic channel to the target lamp if the third panchromatic illuminance and the third panchromatic chromaticity coordinates are acceptable.

Further, each monochromatic illuminance correction value acquired based on each new monochromatic illuminance, each preset standard monochromatic illuminance, and the first parameter is specifically calculated by:

each monochromatic illuminance correction value=each preset standard monochromatic illuminance*first parameter−each new monochromatic illuminance.

Further, the acquiring a new output value of each monochromatic channel based on each new monochromatic illuminance and each monochromatic illuminance correction value specifically includes:

acquiring each corrected monochromatic illuminance by adding each new monochromatic illuminance and each monochromatic illuminance correction value; and acquiring the new output value of each monochromatic channel based on each corrected monochromatic illuminance, where a new output value of the monochromatic channel is maintained as 255 if an output value of the monochromatic channel before adding a monochromatic illuminance correction value is 255.

Further, the lamp color correction method further includes:

acquiring each average monochromatic illuminance of multiple standard lamps as each preset standard monochromatic illuminance, and acquiring each average monochromatic chromaticity coordinate of the multiple standard lamps as each preset standard monochromatic chromaticity coordinate; acquiring an average panchromatic illuminance of the multiple standard lamps as a standard panchromatic illuminance; and acquiring an average panchromatic chromaticity coordinate of the multiple standard lamps as the standard panchromatic chromaticity coordinate.

Further, the first deviation range is a range greater than or equal to 0.8 and less than or equal to 1.2.

Further, the second deviation range is a range from −0.5 times the standard monochromatic chromaticity coordinate to 0.5 times the standard monochromatic chromaticity coordinate.

Further, the first threshold is greater than or equal to 0.8; and in the third deviation range, an absolute value of the difference between the second panchromatic chromaticity coordinate and the standard panchromatic chromaticity coordinate is less than or equal to 0.1.

The present disclosure further provides a lamp color correction system, including: a host computer, a processor, and a detector, where the detector is configured to: acquire each monochromatic illuminance and each monochromatic chromaticity coordinate of a target lamp; acquire a first panchromatic illuminance and first panchromatic chromaticity coordinates of the target lamp; acquire a second panchromatic illuminance and second panchromatic chromaticity coordinates of the target lamp based on the acquired output value of each monochromatic channel; and send the acquired each monochromatic illuminance, each monochromatic chromaticity coordinate, first panchromatic illuminance, first panchromatic chromaticity coordinates, second panchromatic illuminance and second panchromatic chromaticity coordinates of the target lamp to the host computer, such that the host computer sends the acquired each monochromatic illuminance, each monochromatic chromaticity coordinate, first panchromatic illuminance, first panchromatic chromaticity coordinates, second panchromatic illuminance and second panchromatic chromaticity coordinates of the target lamp to the processor for data processing; and the processor is configured to: determine whether a ratio of each monochromatic illuminance to each preset standard monochromatic illuminance satisfies a preset first deviation range; determine whether a difference between each monochromatic chromaticity coordinate and each preset standard monochromatic chromaticity coordinate satisfies a preset second deviation range; acquire a minimum ratio of the monochromatic illuminance to the preset standard monochromatic illuminance as a first parameter, if the ratio of each monochromatic illuminance to each preset standard monochromatic illuminance satisfies the first deviation range and the difference between each monochromatic chromaticity coordinate and each preset standard monochromatic chromaticity coordinate satisfies the second deviation range; acquire an output value of each monochromatic channel based on a product of the first parameter and each preset standard monochromatic illuminance, where there is at least an output value of the monochromatic channel that is 255; acquire the second panchromatic illuminance and the second panchromatic chromaticity coordinates of the target lamp based on the acquired output value of each monochromatic channel; and determine that the target lamp is acceptable and update the output value of each monochromatic channel to the target lamp, if a ratio of the second panchromatic illuminance to the first panchromatic illuminance is greater than or equal to a preset first threshold and a difference between the second panchromatic chromaticity coordinate and a standard panchromatic chromaticity coordinate satisfies a preset third deviation range.

An embodiment of the present disclosure further provides a computer-readable storage medium. The computer-readable storage medium stores a computer program, and the computer program is run to control a device where the computer-readable storage medium is located to implement the above lamp color correction method.

Compared with the prior art, the lamp color correction method and system and storage medium according to the embodiments of the present disclosure have the following beneficial effects. The lamp color correction method and system apply to uniformly correcting the colors of the multicolor LED lamps, with fast correction speed, no need for manual correction, and high color accuracy. The present disclosure ensures uniform panchromatic colors of multicolor LED lamps, and uniform mixing effects of two or more colors of the multicolor LED lamps with those of standard lamps.

DETAILED DESCRIPTION

The specific implementations of the present disclosure are described in more detail below with reference to the drawings and embodiments. The following embodiments are illustrative of the present disclosure and should not be construed as limiting the scope of the present disclosure.

Embodiment 1

Figure 1:
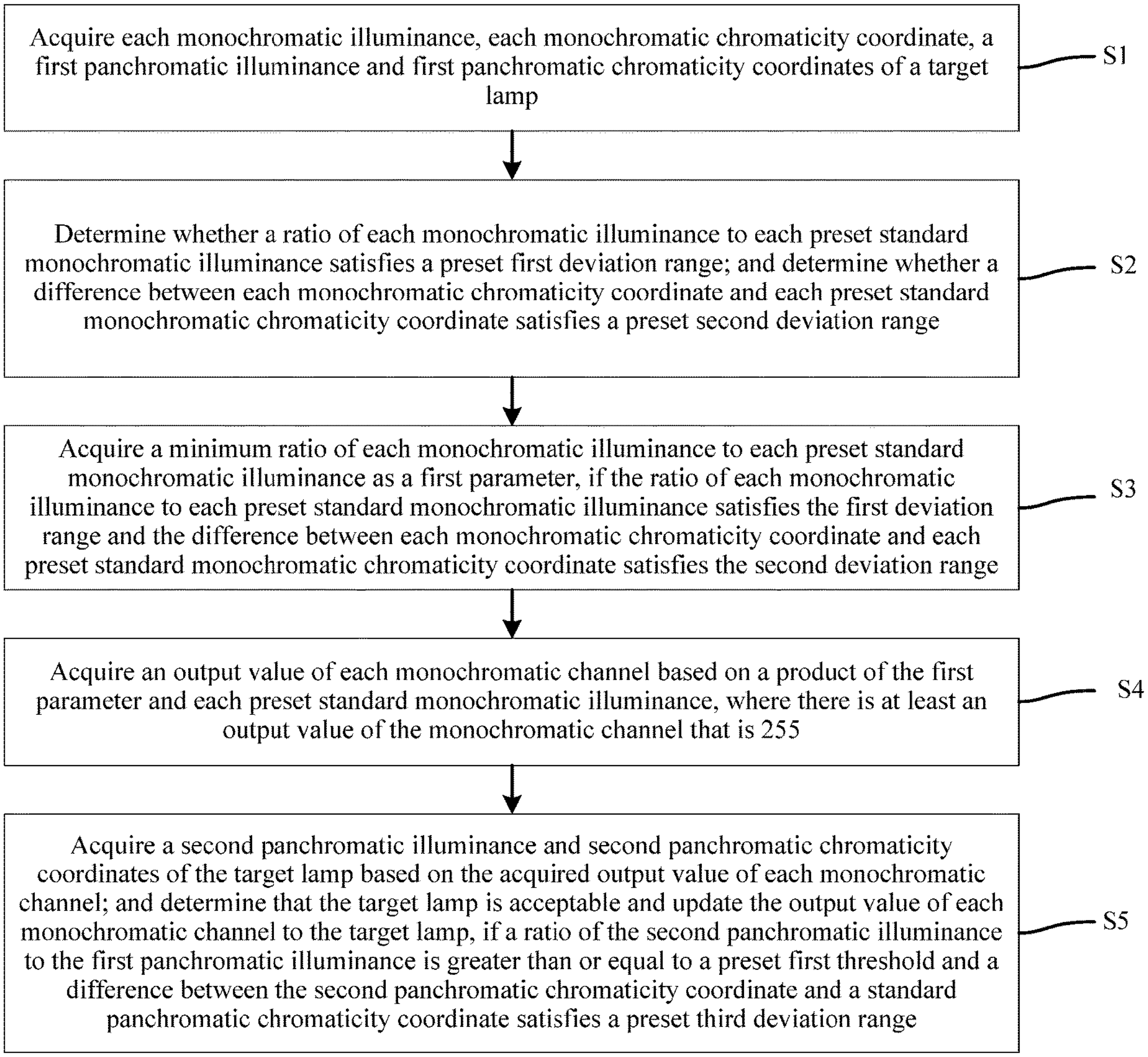
FIG. 1 is a first flowchart of a lamp color correction method according to the present disclosure.
Figure 2:
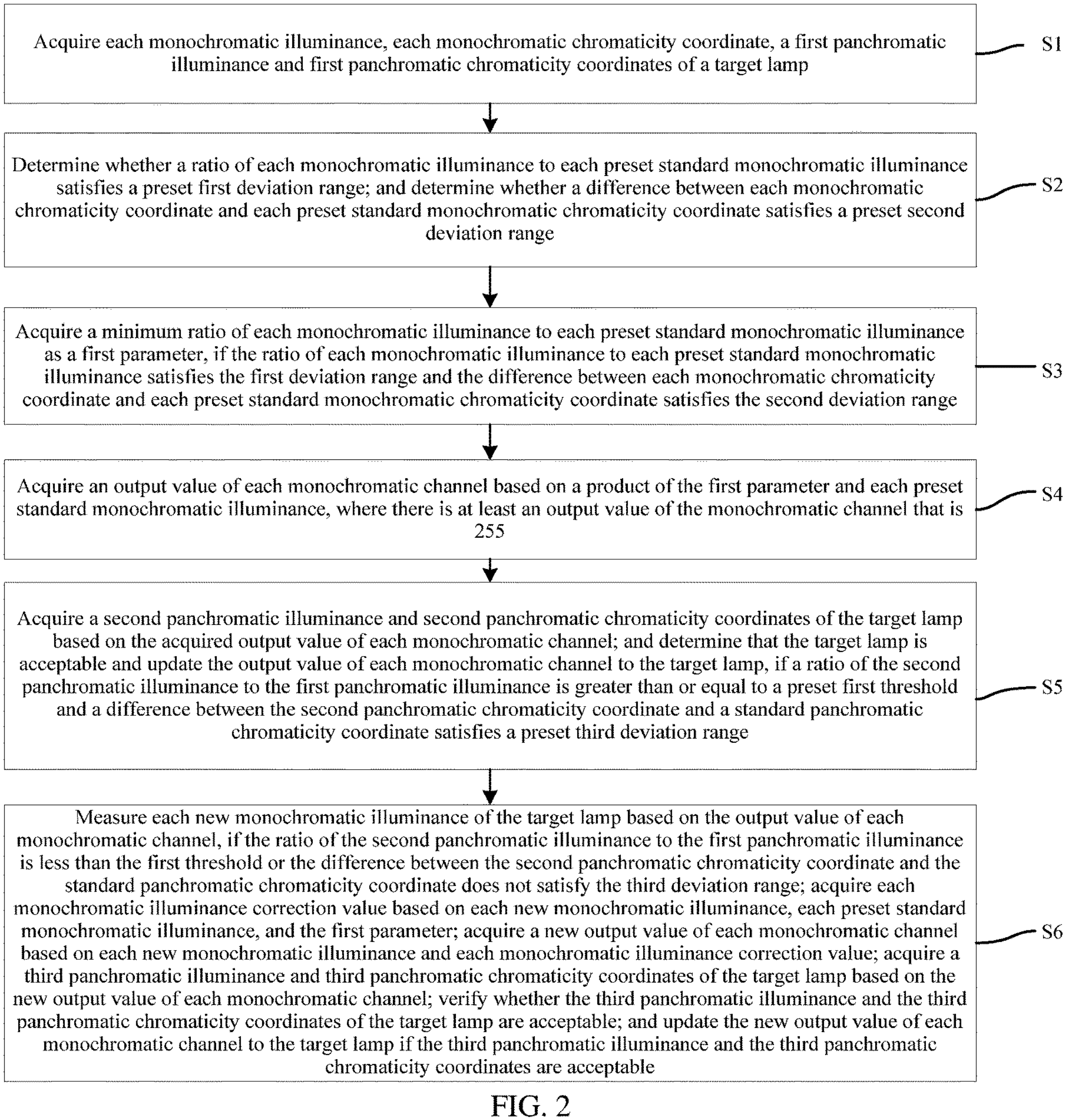
FIG. 2 is a second flowchart of the lamp color correction method according to the present disclosure.

As shown in FIG. 1, the present disclosure provides a lamp color correction method, which applies to correcting colors of multicolor light-emitting diode (LED) lamps, and in particular to correcting the panchromatic colors or color mixing effects of the multicolor LED lamps. The lamp color correction method mainly includes the following steps:

S1. Acquire each monochromatic illuminance, each monochromatic chromaticity coordinate, a first panchromatic illuminance and first panchromatic chromaticity coordinates of a target lamp.

S2. Determine whether a ratio of each monochromatic illuminance to each preset standard monochromatic illuminance satisfies a preset first deviation range; and determine whether a difference between each monochromatic chromaticity coordinate and each preset standard monochromatic chromaticity coordinate satisfies a preset second deviation range.

S3. Acquire a minimum ratio of the monochromatic illuminance to the preset standard monochromatic illuminance as a first parameter, if the ratio of each monochromatic illuminance to each preset standard monochromatic illuminance satisfies the first deviation range and the difference between each monochromatic chromaticity coordinate and each preset standard monochromatic chromaticity coordinate satisfies the second deviation range.

S4. Acquire an output value of each monochromatic channel based on a product of the first parameter and each preset standard monochromatic illuminance, where there is at least an output value of the monochromatic channel that is 255.

S5. Acquire a second panchromatic illuminance and second panchromatic chromaticity coordinates of the target lamp based on the acquired output value of each monochromatic channel; and determine that the target lamp is acceptable and update the output value of each monochromatic channel to the target lamp, if a ratio of the second panchromatic illuminance to the first panchromatic illuminance is greater than or equal to a preset first threshold and a difference between the second panchromatic chromaticity coordinate and a standard panchromatic chromaticity coordinate satisfies a preset third deviation range.

In this embodiment, in order to facilitate the description and understanding of the technical solution, the target lamp includes an LED light source of six colors, namely red (R), green (G), blue (B), amber (A), lawn green (L), and cyan (C).

In step S1, the monochromatic illuminance, the monochromatic chromaticity coordinates, the first panchromatic illuminance and the first panchromatic chromaticity coordinates of the target lamp are acquired. In the specific implementation of step S1, the illuminance and chromaticity coordinates of each of the six colors are acquired.

First, the monochromatic illuminance, the monochromatic chromaticity coordinates, the panchromatic illuminance, and the panchromatic chromaticity coordinates of the target lamp are acquired, namely, Er, (xr,yr), Eg, (xg,yg), Eb, (xb,yb), Ea, (xa,ya), E1, (x1,y1), Ec, (xc,yc), Eq, and (xq,yq). For example, Er denotes the illuminance of red, (xr,yr) denote the chromaticity coordinates of red, and q denotes panchromatic.

The acquired data of the target lamp are then compared with the preset standard illuminance and the standard chromaticity coordinates, respectively. Specifically, in step S2, it is determined whether a ratio of each monochromatic illuminance to each preset standard monochromatic illuminance satisfies a preset first deviation range, and whether a difference between each monochromatic chromaticity coordinate and each preset standard monochromatic chromaticity coordinate satisfies a preset second deviation range.

Since the standard illuminance and the standard chromaticity coordinates play a very important role, more accurate standard illuminances and standard chromaticity coordinates are required.

Therefore, the present disclosure provides a method for acquiring the standard illuminance and the standard chromaticity coordinates. Specifically, this method is embodied in step S7: acquire each average monochromatic illuminance of multiple standard lamps as each preset standard monochromatic illuminance, and acquire each average monochromatic chromaticity coordinate of the multiple standard lamps as each preset standard monochromatic chromaticity coordinate; acquire an average panchromatic illuminance of the multiple standard lamps as a standard panchromatic illuminance; and acquire an average panchromatic chromaticity coordinate of the multiple standard lamps as the standard panchromatic chromaticity coordinate.

The standard illuminances and chromaticity coordinates are acquired from multiple standard lamps, so as to acquire more accurate standard illuminances and standard chromaticity coordinates and reduce system errors. This method also applies to acquiring the standard panchromatic illuminance and the standard panchromatic chromaticity coordinates. In order to better describe the technical solution of the present disclosure, the preset standard values are denoted by adding the letter s. that is, the preset standard monochromatic illuminances, the preset monochromatic chromaticity coordinates, the preset panchromatic illuminance, and the preset standard panchromatic chromaticity coordinates are denoted as follows: Ers, (xrs,yrs), Egs, (xgs,ygs), Ebs, (xbs,ybs), Eas, (xas,yas), E1s, (x1s,y1s), Ecs, (xcs,ycs), and Eqs, (xqs,yqs). For example, Ers denotes the standard monochromatic illuminance of red, and (xrs,yrs) denote the standard monochromatic chromaticity coordinates of red. The preset data can be stored in a processor for subsequent verification.

In the implementation of step S2, in this embodiment, the first deviation range is a range greater than or equal to 0.8 and less than or equal to 1.2. In this embodiment, the second deviation range is a range from −0.5 times the standard monochromatic chromaticity coordinate to 0.5 times the standard monochromatic chromaticity coordinate.

In this embodiment, it is determined one by one whether the ratios such as Er/Ers, Eg/Egs, Eb/Ebs, Ea/Eas, E1/E1s, and Ec/Ecs are greater than or equal to 0.8 and less than or equal to 1.2. In this embodiment, the first deviation range includes endpoint values.

In this embodiment, those skilled in the art know that the chromaticity coordinates include the abscissa and the ordinate. Therefore, those skilled in the art know that the second deviation range is a range from −0.5 times the standard monochromatic chromaticity coordinate to 0.5 times the standard monochromatic chromaticity coordinate. It means that the difference between the abscissa of the monochromatic chromaticity coordinates minus the abscissa of the standard chromaticity coordinates is greater than or equal to −0.5 times the abscissa of the standard chromaticity coordinates and less than or equal to 0.5 times the abscissa of the standard chromaticity coordinates. Similarly, the difference between the ordinate of the monochrome chromaticity coordinates minus the ordinate of the standard chromaticity coordinates is greater than or equal to −0.5 times the ordinate of the standard chromaticity coordinates and less than or equal to 0.5 times the ordinate of the standard chromaticity coordinates.

For example, the mathematical expressions of red are $|xr-xrs|\leq 0.5\ xrs$; $|yr-yrs|\leq 0.5yrs$. Other colors and so on.

If the two conditions are both satisfied, the subsequent step is performed. That is, S3: Acquire a minimum ratio of the monochromatic illuminance to the preset standard monochromatic illuminance as a first parameter, if the ratio of each monochromatic illuminance to each preset standard monochromatic illuminance satisfies the first deviation range and the difference between each monochromatic chromaticity coordinate and each preset standard monochromatic chromaticity coordinate satisfies the second deviation range.

In this embodiment, Er/Ers, Eg/Egs, Eb/Ebs, Ea/Eas, E1/E1s, and Ec/Ecs are calculated, sorted and compared, and the minimum ratio K is taken as the first parameter.

In step S4, the output value of each monochromatic channel is acquired based on the product of the first parameter and the preset standard monochromatic illuminance, where there is at least an output value of the monochromatic channel that is 255.

In this implementation, Ers*K, Egs*K, Ebs*K, Eas*K, E1s*K, and Ecs*K are calculated. According to the calculated data, the values of each monochromatic channel, namely Dr1, Dg1, Db1, Da1, DI1, and Dc1 are found by looking up the table, among which at least one is 255.

In step S5, the second panchromatic illuminance and second panchromatic chromaticity coordinates of the target lamp are acquired based on the output value of each monochromatic channel; and it is determined that the target lamp is acceptable and the acquired output value of each monochromatic channel is updated to the target lamp, if a ratio of the second panchromatic illuminance to the first panchromatic illuminance is greater than or equal to a preset first threshold and a difference between the second panchromatic chromaticity coordinate and a standard panchromatic chromaticity coordinate satisfies a preset third deviation range.

In this embodiment, based on the channel value, the second illuminance E1 and the second chromaticity coordinates (x1,y1) are output.

It is determined whether $E1/Eq\geq 0.8$, $|x1-xqs|\leq 0.01$, and $|y1\text{-}yqs|\leq 0.01$. If yes, these channel values are downloaded and updated to the target lamp. If not, further verification is performed. The E1 is output from the calculated Dr1. Dg1, Db1, Da1, D11, and Dc1, and the acquired illuminance and chromaticity coordinates are tested through a detector.

In this embodiment, the first threshold is greater than or equal to 0.8; and in the third deviation range, an absolute value of the difference between the second panchromatic chromaticity coordinate and the standard panchromatic chromaticity coordinate is less than or equal to 0.1.

In this embodiment, the lamp color correction method further includes: S6: measure each new monochromatic illuminance of the target lamp based on the output value of each monochromatic channel, if the ratio of the second panchromatic illuminance to the first panchromatic illuminance is less than the first threshold or the difference between the second panchromatic chromaticity coordinate and the standard panchromatic chromaticity coordinate does not satisfy the third deviation range; acquire each monochromatic illuminance correction value based on each new monochromatic illuminance, each preset standard monochromatic illuminance, and the first parameter; acquire a new output value of each monochromatic channel based on each new monochromatic illuminance and each monochromatic illuminance correction value; acquire a third panchromatic illuminance and third panchromatic chromaticity coordinates of the target lamp based on the new output value of each monochromatic channel; verify whether the third panchromatic illuminance and the third panchromatic chromaticity coordinates of the target lamp are acceptable; and update the new output value of each monochromatic channel to the target lamp if the third panchromatic illuminance and the third panchromatic chromaticity coordinates are acceptable.

In this embodiment, each monochromatic illuminance correction value acquired based on each new monochromatic illuminance, each preset standard monochromatic illuminance, and the first parameter is specifically calculated by:

each monochromatic illuminance correction value=each preset standard monochromatic illuminance*first parameter−each new monochromatic illuminance.

In this embodiment, the acquiring a new output value of each monochromatic channel based on each new monochromatic illuminance and each monochromatic illuminance correction value specifically includes:

Acquire each corrected monochromatic illuminance by adding each new monochromatic illuminance and each monochromatic illuminance correction value; and acquire the new output value of each monochromatic channel based on each corrected monochromatic illuminance, where a new output value of the monochromatic channel is maintained as 255 if an output value of the monochromatic channel before adding a monochromatic illuminance correction value is 255.

In this embodiment, the monochromatic illuminances Er1, Eg1, Eb1, Ea1, E11, and Ec1 are respectively tested according to the monochromatic channel values Dr1, Dg1, Db1, Da1, D11, and Dc1, and the differences, namely (Ers*K)-Er1. (Egs*K)-Eg1, (Ebs*K)-Eb1, (Eas*K)-Ea1, (E1s*K)-E11, and (Ecs*K)-Ec1 are calculated, which are the monochromatic illuminance correction values.

The Er1, Eg1, Eb1, Ea1, E11, and Ec1 are added to the corresponding monochromatic correction values to acquire the channel values Dr2, Dg2, Db2, Da2, D12, and Dc2. If the channel value before the addition is 255, then 255 is directly output. Based on the output values of the monochromatic channels, the third panchromatic illuminance E2 and third panchromatic chromaticity coordinates (x2,y2) of the target lamp are acquired. It is determined whether E2/Eq≥0.8. |x2−xqs|≤0.01, and |y2−yqs|≤0.01. If yes, these channel values are downloaded and updated to the target lamp. If not, the new monochromatic illuminance of the target lamp is measured based on the acquired channel values Dr2, Dg2, Db2, Da2, D12, and Dc2. The monochromatic illuminance correction value is acquired based on the new monochromatic illuminance, the standard monochromatic illuminance, and the first parameter. The new output value of each monochromatic channel is acquired based on the acquired new monochromatic illuminance and the monochromatic illuminance correction value. The fourth panchromatic illuminance and fourth panchromatic chromaticity coordinates of the target lamp are acquired based on the new output value of each monochromatic channel. It is verified whether the fourth panchromatic illuminance and the fourth panchromatic chromaticity coordinates of the target lamp are acceptable. The new output value of each monochromatic channel is updated to the target lamp if the fourth panchromatic illuminance and the fourth panchromatic chromaticity coordinates are acceptable.

The lamp color correction method and system apply to uniformly correcting the colors of the multicolor LED lamps, with fast correction speed, no need for manual correction, and high color accuracy. The present disclosure ensures uniform panchromatic colors of multicolor LED lamps, and uniform mixing effects of two or more colors of the multicolor LED lamps with those of standard lamps.

Embodiment 2

Figure 3:
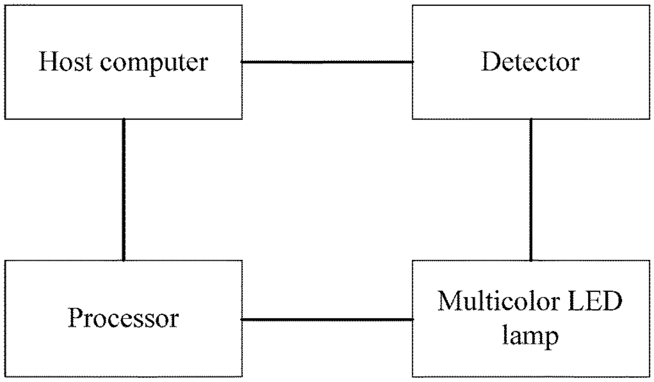
FIG. 3 is a structural diagram of a lamp color correction system according to the present disclosure.

Referring to FIG. 3, the present disclosure provides a lamp color correction system, including: a host computer, a processor, and a detector.

The detector is configured to: acquire each monochromatic illuminance and each monochromatic chromaticity coordinate of a target lamp; acquire a first panchromatic illuminance and first panchromatic chromaticity coordinates of the target lamp; acquire a second panchromatic illuminance and second panchromatic chromaticity coordinates of the target lamp based on the acquired output value of each monochromatic channel; and send the acquired each monochromatic illuminance, each monochromatic chromaticity coordinate, first panchromatic illuminance, first panchromatic chromaticity coordinates, second panchromatic illuminance and second panchromatic chromaticity coordinates of the target lamp to the host computer, such that the host computer sends the acquired each monochromatic illuminance, each monochromatic chromaticity coordinate, first panchromatic illuminance, first panchromatic chromaticity coordinates, second panchromatic illuminance and second panchromatic chromaticity coordinates of the target lamp to the processor for data processing.

The processor is configured to: determine whether a ratio of each monochromatic illuminance to each preset standard monochromatic illuminance satisfies a preset first deviation range; determine whether a difference between each monochromatic chromaticity coordinate and each preset standard monochromatic chromaticity coordinate satisfies a preset second deviation range; acquire a minimum ratio of the monochromatic illuminance to the preset standard monochromatic illuminance as a first parameter, if the ratio of each monochromatic illuminance to each preset standard monochromatic illuminance satisfies the first deviation range and the difference between each monochromatic chromaticity coordinate and each preset standard monochromatic chromaticity coordinate satisfies the second deviation range; acquire an output value of each monochromatic channel based on a product of the first parameter and each preset standard monochromatic illuminance, where there is at least an output value of the monochromatic channel that is 255; acquire the second panchromatic illuminance and the second panchromatic chromaticity coordinates of the target lamp based on the acquired output value of each monochromatic channel; and determine that the target lamp is acceptable and update the output value of each monochromatic channel to the target lamp, if a ratio of the second panchromatic illuminance to the first panchromatic illuminance is greater than or equal to a preset first threshold and a difference between the second panchromatic chromaticity coordinate and a standard panchromatic chromaticity coordinate satisfies a preset third deviation range.

The lamp color correction system in this embodiment applies the lamp color correction method of Embodiment 1. Those skilled in the art can apply the lamp color correction method of Embodiment 1 to the lamp color correction system to achieve corresponding technical effects.

Since the lamp color correction system of Embodiment 2 applies the lamp color correction method of Embodiment 1, the lamp color correction system has the same technical features as the lamp color correction method, which will not be repeated herein.

Embodiment 3:

The present disclosure further provides a computer-readable storage medium. The computer-readable storage medium stores a computer program, and the computer program is run to control a device where the computer-readable storage medium is located to implement the lamp color correction method in Embodiment 1.

In summary, the lamp color correction method and system and storage medium according to the embodiments of the present disclosure have the following beneficial effects. The lamp color correction method and system apply to uniformly correcting the colors of the multicolor LED lamps, with fast correction speed, no need for manual correction, and high color accuracy. The present disclosure ensures uniform panchromatic colors of multicolor LED lamps, and uniform mixing effects of two or more colors of the multicolor LED lamps with those of standard lamps.

The above described are only preferred implementations of the present disclosure. It should be noted that improvements and replacements may further be made by those of ordinary skill in the art without departing from the principle of the present disclosure, and such improvements and replacements should be deemed as falling within the protection scope of the present disclosure.

The invention claimed is:

1. A lamp color correction method, comprising:

acquiring each monochromatic illuminance, each monochromatic chromaticity coordinate, a first panchromatic illuminance and first panchromatic chromaticity coordinates of a target lamp;

determining whether a ratio of each monochromatic illuminance to each preset standard monochromatic illuminance satisfies a preset first deviation range; determining whether a difference between each monochromatic chromaticity coordinate and each preset standard monochromatic chromaticity coordinate satisfies a preset second deviation range;

acquiring a minimum ratio of the monochromatic illuminance to the preset standard monochromatic illuminance as a first parameter, if the ratio of each monochromatic illuminance to each preset standard monochromatic illuminance satisfies the first deviation range and the difference between each monochromatic chromaticity coordinate and each preset standard monochromatic chromaticity coordinate satisfies the second deviation range;

acquiring an output value of each monochromatic channel based on a product of the first parameter and each preset standard monochromatic illuminance, wherein there is at least an output value of the monochromatic channel that is 255; and acquiring a second panchromatic illuminance and second panchromatic chromaticity coordinates of the target lamp based on the output value of each monochromatic channel; and determining that the target lamp is acceptable and updating the output value of each monochromatic channel to the target lamp, if a ratio of the second panchromatic illuminance to the first panchromatic illuminance is greater than or equal to a preset first threshold and a difference between the second panchromatic chromaticity coordinate and a standard panchromatic chromaticity coordinate satisfies a preset third deviation range.

2. The lamp color correction method according to claim 1, wherein the lamp color correction method further comprises: measuring each new monochromatic illuminance of the target lamp based on the output value of each monochromatic channel, if the ratio of the second panchromatic illuminance to the first panchromatic illuminance is less than the first threshold or the difference between the second panchromatic chromaticity coordinate and the standard panchromatic chromaticity coordinate does not satisfy the third deviation range; acquiring each monochromatic illuminance correction value based on the each new monochromatic illuminance, each preset standard monochromatic illuminance, and the first parameter; acquiring a new output value of each monochromatic channel based on the each new monochromatic illuminance and each monochromatic illuminance correction value; acquiring a third panchromatic illuminance and third panchromatic chromaticity coordinates of the target lamp based on the new output value of each monochromatic channel; verifying whether the third panchromatic illuminance and the third panchromatic chromaticity coordinates of the target lamp are acceptable; and updating the new output value of each monochromatic channel to the target lamp if the third panchromatic illuminance and the third panchromatic chromaticity coordinates are acceptable.

3. The lamp color correction method according to claim 2, wherein each monochromatic illuminance correction value acquired based on the each new monochromatic illuminance, each preset standard monochromatic illuminance, and the first parameter is specifically calculated by:

each monochromatic illuminance correction value=each preset standard monochromatic illuminance*first parameter−each new monochromatic illuminance.

4. A non-transitory computer-readable storage medium, storing a computer program, wherein the computer program is run to control a device where the non-transitory computer-readable storage medium is located to implement the lamp color correction method according to claim 3.

5. The lamp color correction method according to claim 2, wherein the acquiring a new output value of each monochromatic channel based on the each new monochromatic illuminance and each monochromatic illuminance correction value specifically comprises:

acquiring each corrected monochromatic illuminance by adding the each new monochromatic illuminance and each monochromatic illuminance correction value; and acquiring the new output value of each monochromatic channel based on each corrected monochromatic illuminance, wherein a new output value of the monochromatic channel is maintained as 255 if an output value of the monochromatic channel before adding a monochromatic illuminance correction value is 255.

6. A non-transitory computer-readable storage medium, storing a computer program, wherein the computer program is run to control a device where the non-transitory computer-readable storage medium is located to implement the lamp color correction method according to claim 5.

7. A non-transitory computer-readable storage medium, storing a computer program, wherein the computer program is run to control a device where the non-transitory computer-readable storage medium is located to implement the lamp color correction method according to claim 2.

8. The lamp color correction method according to claim 1, wherein the lamp color correction method further comprises:

acquiring each average monochromatic illuminance of multiple standard lamps as each preset standard monochromatic illuminance, and acquiring each average monochromatic chromaticity coordinate of the multiple standard lamps as each preset standard monochromatic chromaticity coordinate; acquiring an average panchromatic illuminance of the multiple standard lamps as a standard panchromatic illuminance; and acquiring an average panchromatic chromaticity coordinate of the multiple standard lamps as the standard panchromatic chromaticity coordinate.

9. A non-transitory computer-readable storage medium, storing a computer program, wherein the computer program is run to control a device where the non-transitory computer-readable storage medium is located to implement the lamp color correction method according to claim 8.

10. The lamp color correction method according to claim 1, wherein the first deviation range is a range greater than or equal to 0.8 and less than or equal to 1.2.

11. A non-transitory computer-readable storage medium, storing a computer program, wherein the computer program is run to control a device where the non-transitory computer-readable storage medium is located to implement the lamp color correction method according to claim 10.

12. The lamp color correction method according to claim 1, wherein the second deviation range is a range from −0.5 times the standard monochromatic chromaticity coordinate to 0.5 times the standard monochromatic chromaticity coordinate.

13. A non-transitory computer-readable storage medium, storing a computer program, wherein the computer program is run to control a device where the non-transitory computer-readable storage medium is located to implement the lamp color correction method according to claim 12.

14. The lamp color correction method according to claim 1, wherein the first threshold is greater than or equal to 0.8; and in the third deviation range, an absolute value of the difference between the second panchromatic chromaticity coordinate and the standard panchromatic chromaticity coordinate is less than or equal to 0.1.

15. A non-transitory computer-readable storage medium, storing a computer program, wherein the computer program is run to control a device where the non-transitory computer-readable storage medium is located to implement the lamp color correction method according to claim 14.

16. A non-transitory computer-readable storage medium, storing a computer program, wherein the computer program is run to control a device where the non-transitory computer-readable storage medium is located to implement the lamp color correction method according to claim 1.

17. A lamp color correction system, comprising: a host computer, a processor, and a detector, wherein the detector is configured to: acquire each monochromatic illuminance and each monochromatic chromaticity coordinate of a target lamp; acquire a first panchromatic illuminance and first panchromatic chromaticity coordinates of the target lamp; acquire a second panchromatic illuminance and second panchromatic chromaticity coordinates of the target lamp based on an acquired output value of each monochromatic channel; and send the acquired each monochromatic illuminance, each monochromatic chromaticity coordinate, first panchromatic illuminance, first panchromatic chromaticity coordinates, second panchromatic illuminance and second panchromatic chromaticity coordinates of the target lamp to the host computer, such that the host computer sends the acquired each monochromatic illuminance, each monochromatic chromaticity coordinate, first panchromatic illuminance, first panchromatic chromaticity coordinates, second panchromatic illuminance and second panchromatic chromaticity coordinates of the target lamp to the processor for data processing; and the processor is configured to: determine whether a ratio of each monochromatic illuminance to each preset standard monochromatic illuminance satisfies a preset first deviation range; determine whether a difference between each monochromatic chromaticity coordinate and each preset standard monochromatic chromaticity coordinate satisfies a preset second deviation range; acquire a minimum ratio of the monochromatic illuminance to the preset standard monochromatic illuminance as a first parameter, if the ratio of each monochromatic illuminance to each preset standard monochromatic illuminance satisfies the first deviation range and the difference between each monochromatic chromaticity coordinate and each preset standard monochromatic chromaticity coordinate satisfies the second deviation range; acquire an output value of each monochromatic channel based on a product of the first parameter and each preset standard monochromatic illuminance, wherein there is at least an output value of the monochromatic channel that is 255; acquire the second panchromatic illuminance and the second panchromatic chromaticity coordinates of the target lamp based on the output value of each monochromatic channel; and determine that the target lamp is acceptable and update the output value of each monochromatic channel to the target lamp, if a ratio of the second panchromatic illuminance to the first panchromatic illuminance is greater than or equal to a preset first threshold and a difference between the second panchromatic chromaticity coordinate and a standard panchromatic chromaticity coordinate satisfies a preset third deviation range.

* * * * *